(12) United States Patent
Oksanen

(10) Patent No.: US 6,865,584 B2
(45) Date of Patent: Mar. 8, 2005

(54) METHOD FOR RECOVERING A DATABASE PROVIDED WITH DISK BACK-UP

(75) Inventor: Kenneth Oksanen, Espoo (FI)

(73) Assignee: Nokia Corporation, Espoo (FI)

( * ) Notice: Subject to any disclaimer, the term of this patent is extended or adjusted under 35 U.S.C. 154(b) by 441 days.

(21) Appl. No.: 10/015,131

(22) Filed: Dec. 10, 2001

(65) Prior Publication Data

US 2002/0078078 A1 Jun. 20, 2002

Related U.S. Application Data

(63) Continuation of application No. PCT/FI00/00436, filed on May 12, 2000.

(30) Foreign Application Priority Data

Jun. 10, 1999 (FI) .................................................. 991336

(51) Int. Cl.[7] .............................................. G06F 17/30
(52) U.S. Cl. ...................................... 707/202; 707/206
(58) Field of Search ................................. 707/202, 206

(56) References Cited

U.S. PATENT DOCUMENTS

| 5,561,795 A | 10/1996 | Sarkar ......................... 707/202 |
| 5,561,798 A | 10/1996 | Haderle et al. ............. 707/202 |
| 5,577,246 A | 11/1996 | Priddy et al. ................ 707/202 |
| 5,581,750 A | 12/1996 | Haderle et al. ............. 707/202 |

FOREIGN PATENT DOCUMENTS

| EP | 0790558 | 8/1997 |
| JP | 62050938 | 3/1987 |

OTHER PUBLICATIONS

"Extended Ephemeral Logging: Log Storage Management For Applications With Long–lived Transactions," John S. Keen, Silicon Graphics and William J. Dally, Massachusetts Institute For Technology; ACM Transactions On Database Systems, vol. 22, No. 1, Mar. 1997, pp. 1–42.

"Atomic Garbage Collection: Managing A Stable Heap," E. Kolodner, B. Liskov, and W. Weihl; Laboratory For Computer Science, Massachusetts Institute For Technology, Cambridge MA 02139, 1989 ACM, pp. 15–25.

Primary Examiner—Greta Robinson
(74) Attorney, Agent, or Firm—Squire, Sanders & Dempsey, L.L.P.

(57) ABSTRACT

The invention relates to a method for recovering a database provided with disk backup. A database comprising a first generation and at least one mature generation is maintained in a central memory. The generations contain memory cells in which data and additionally pointers constituting references between memory cells are stored. Generation-specific remembered sets are maintained in the area of mature generations in the central memory. Live memory cells in the area of the first generation are periodically collected as a new mature generation into the central memory into the area of mature generations. Garbage collection is performed generationally in the area of mature generations, in which live memory cells are copied in the order indicated by the remembered set into a temporally more recent mature generation.

10 Claims, 7 Drawing Sheets

METHOD FOR RECOVERING A DATABASE PROVIDED WITH DISK BACK-UP

This application is a continuation of international application serial number PCT/FI00/00435, filed 12 May 2000.

FIELD OF THE INVENTION

The present invention generally relates to a memory provided with disk back-up, in which garbage collection is performed. More specifically; the invention relates to a method wherewith a functional central database in which garbage collection is performed can be recovered after a failure, such as a power outage. Functionality in this context means that an application using the memory is not allowed to make any amendments directly to the data, but a copy must first be made of the stored data, in which the amendment is then made (the amendment is not made directly to the existing data). Such an updating procedure is also called by the term "copy-on-write". The method in accordance with the invention can be used in several different database environments, particularly in such where back-up and real-time performance are essential factors. An example of such is the database of a telephone exchange, comprising data relating to the operation of the communications network.

BACKGROUND OF THE INVENTION

Memory cells dynamically allocated for the use of an application usually change with time, on account of the execution of the application, so that they become inaccessible to the application. A memory cell is regarded as garbage if the application can no longer access it along any route. Garbage collection denotes an automatic system with which the memory space occupied by such memory cells is restored for the use of an application. Thus, the garbage collector must distinguish garbage from among live memory cells. The last-mentioned denotes memory cells which can still be accessed by the application and which the application will possibly still use. Garbage collectors determine live memory cells typically so that these are cells that can be accessed from the root set of the memory by tracking pointers stored in the memory. A root set denotes data that is immediately accessible to a program without tracking any pointer trail.

Garbage collection increases the reliability of programs, since for example memory management errors can be eliminated thereby.

In copying garbage collection, garbage is not actually collected but live memory cells are transferred (copied) from their location area to a new storage area that is normally contiguous. The original storage area can thereafter be freed for the use of the application, since all live memory cells in said area have been transferred elsewhere. Copying garbage collection methods are generally considered to be quite effective. An important advantage thereof is that they are compacting, thus allowing prevention of memory fragmentation.

A currently common trend is to carry out garbage collection in generations. In such a system, the memory is divided into several areas according to age (generations), and collection is performed more frequently in the younger generations than in the older generations, since in the younger generations the memory cells turn into garbage in greater likelihood (more rapidly) than in the older generations. Thus, garbage collection in the younger generations enables more efficient freeing of memory (more freed memory for the same amount of work). A further principal drawback of non-generational copying garbage collection methods is also that the same memory cells must be copied again in every collecting cycle, since some of the memory cells remain alive from one collecting cycle to another. Then part of the time of the garbage collector is taken up by repeatedly copying the same memory cells. Generational garbage collection also enables the majority of such repeated copying to be avoided.

The present invention relates to generational garbage collection of this kind in a central memory database which, furthermore, is recoverable. A central memory database, or a database in short, denotes in this context a specific main storage area that is normally contiguous. Recovery, on the other hand, means that data resident in the central memory is also written into a disk memory, and hence in a failure situation, such as a power outage, the situation that was prevalent in the central memory at the time of failure can be reconstructed using the data stored in the disk memory.

The method of the invention is specifically intended for applications in which real-time performance and reliability are essential characteristics. As was stated above, one field of application is constituted by network elements of a communications network. At telephone exchanges, for example, it must be possible to carry out garbage collection as efficiently as possible so that it does not create any extra delay to the existing connections or connection setup processes in progress.

In known systems with disk back-up, so-called remembered sets and possibly also a plurality of other auxiliary structures are maintained as back-up on disk in view of a possible failure, so that the database may be reconstructed after the failure. In such systems, the amount of disk writing due to garbage collection is very high. In connection with recovery, the remembered sets and possible other auxiliary structures stored for example in logs are examined, and the state of the remaining database is updated to correspond to that preceding the failure. A further drawback of such known systems is that the amount of data resulting from back-up is high compared with the memory capacity occupied by payload data.

Hence, a considerable problem in systems with disk back-up requiring maximum real-time performance is how the disk traffic resulting from back-up (mainly writing onto disk) should be handled so as to produce as little delay as possible to the operation of the system. In view of back-up it would naturally be preferable if the amendments in the central memory could be entered on disk immediately, but this is not possible in view of the efficiency of the system, since in practice disk traffic would increase far too much and would excessively retard the operation of the system. From the point of view of the efficiency of the system, particularly small amendments that occur often are problematic, since the operation of the disk memory is retarded considerably if the write head must be repeatedly moved from one location to another. Thus, as much sequential data as possible should be written into the disk memory at a time. Thus, in order to optimize the disk traffic, attention should be paid in addition to the quantity of disk traffic, also to the fact that the writing transactions onto disk can be carried out as continuously as possible and the number of writing cycles can be maintained low.

The problem is thus how garbage collection should be performed in such a way that a large main storage area can be backed up to disk, maintaining the performance of the system as good as possible.

SUMMARY OF THE INVENTION

It is an object of the present invention to provide a solution to the problem described above. This object is achieved with the method defined in the independent claim.

In the method in accordance with the invention, new cells to be entered in the database are first located in a so-called first generation, which is a part of the memory separate from the remainder of the database. Periodically, or when the memory space reserved for the first generation is depleted, the first generation is collected as the youngest generation in a so-called area of mature generations. The idea is to keep on disk, in addition to each version of (mature) generation, the previous version of said generation and to use it for recovery, so that the most current version can be updated to be correct. Recovery is implemented using said versions (a) by reconstructing the remembered set of said previous version stored on disk, indicating the pointers referring to said generation, and (b) by changing the pointers indicated by the remembered set to point to the memory cells of said most current version. Any such amendments onto disk that, with the proceeding of the garbage collection, change the references from said generation (the most current version) to the other generations need not be written onto disk. The invention thus makes use of data (the previous generation version) that must be written onto disk in any case so that the most current version can be left obsolete, which permits reducing the amount of writing onto disk.

Hence, the solution in accordance with the invention enables a substantial reduction in writing onto disk required by back-up, thus making the operation of the database substantially more rapid than heretofore.

On account of the solution in accordance with the invention, the memory space left for the actual payload data can also be made substantially greater than heretofore, since it is not necessary to store the remembered sets on disk at all. Also, the central memory will only need the remembered sets in uncollected mature generations only.

BRIEF DESCRIPTION OF THE DRAWINGS

In the following, the invention and its preferred embodiments will be described in closer detail with reference to examples in accordance with FIGS. 1–8c in the accompanying drawings, in which.

DETAILED DESCRIPTION OF THE INVENTION

Figure 1:
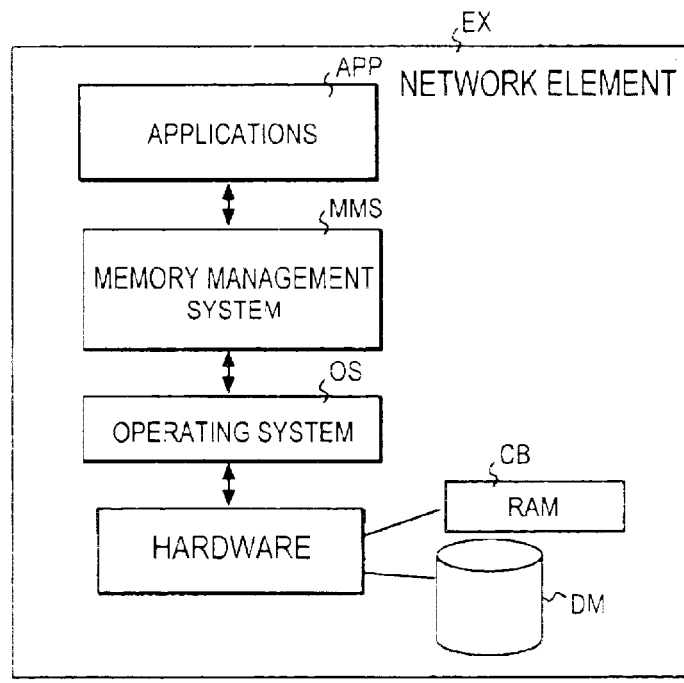
FIG. 1 is a block diagram illustrating the components of a system in accordance with the invention.

FIG. 1 illustrates the application environment of the method in accordance with the invention. E.g. a telephone exchange EX has a central memory database CB provided with disk back-up and managed by a memory management system MMS in accordance with the invention. The memory management system communicates through an operating system OS with entities on hardware level (disk memory DM and central memory RAM). Applications or application programs (APP) are termed in this context all layers that are above the memory management system, since from the point of view of a memory management system they can be regarded as applications. In addition to an actual application, these layers can include e.g. index structures. The present invention does not relate to these layers, and its implementation is not dependent on the implementation of these layers.

Figure 2:
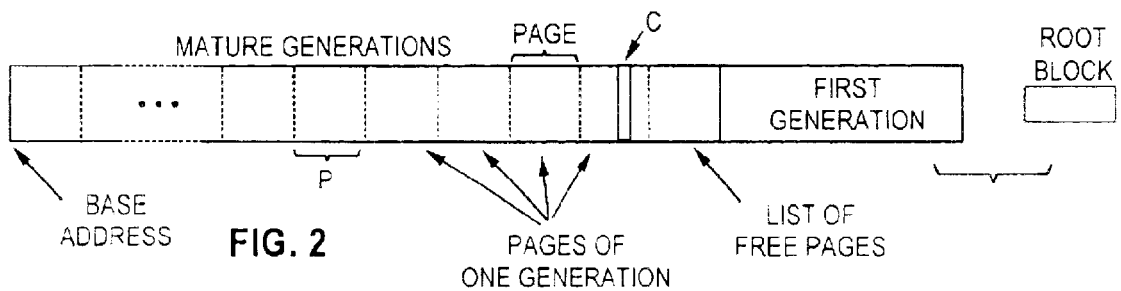
FIG. 2 illustrates the layout of the central memory.

As stated previously, a (central memory) database in this context means a contiguous main storage area. FIG. 2 illustrates the layout of the central memory. The database comprises a root block, a first generation (one), and varying numbers of mature generations depending on the situation. A large database may contain thousands of mature generations, whereas an empty database does not necessarily contain any mature generations yet. Each mature generation consists of one or more pages P. Even though the figure shows the pages of one generation in succession, in practice the pages of one generation are located in succession only at the beginning when the database is young, and dispersed in the memory area of mature generations after garbage collection has been performed for a sufficient time. Write requests are page-related, and thus in practice one or more pages are written onto disk at a time. The pages and the first generation contain cells C, a cell being the smallest possible storage allocation unit (for clarity, the figure only depicts one cell). The database thus comprises generations of varying sizes, arranged by age. The size of the generations typically varies from a couple of hundred kilobytes to several megabytes, the pages typically have a size of about 64 kilobytes, and the cells again have a size from a couple of words to a couple of dozen words. The root block typically comprises a standard number of words, e.g. 128 words. The application constructs all other data structures from the cells. The data contained in the cells is dependent on the application and can be of any type. However, the garbage collector must be aware of which words in a cell are pointers and which not and, furthermore, of the size of the cell.

Figure 4A:
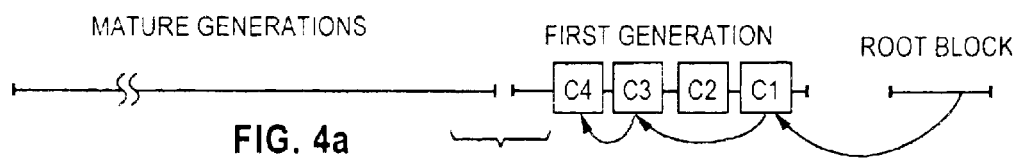
FIGS. 4a and 4b illustrate the process steps shown in FIG. 3, FIGS. 5a . . . 5f illustrate the different steps in collecting the first generation, FIGS. 6a . . . 6e illustrate the different steps in collecting the mature generations.
Figure 4B:
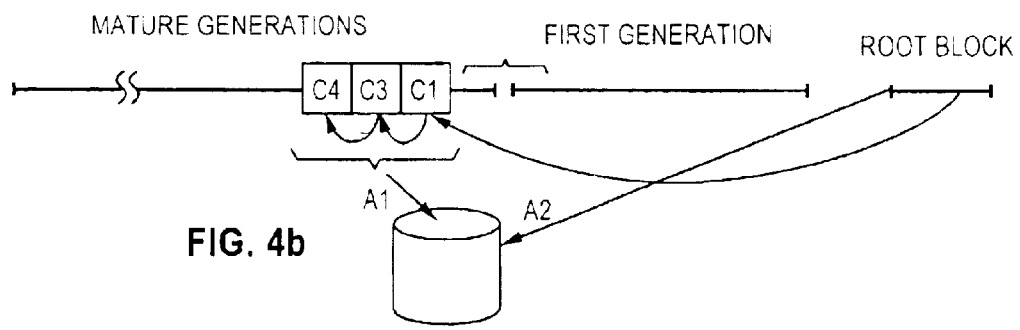
Figure 3:
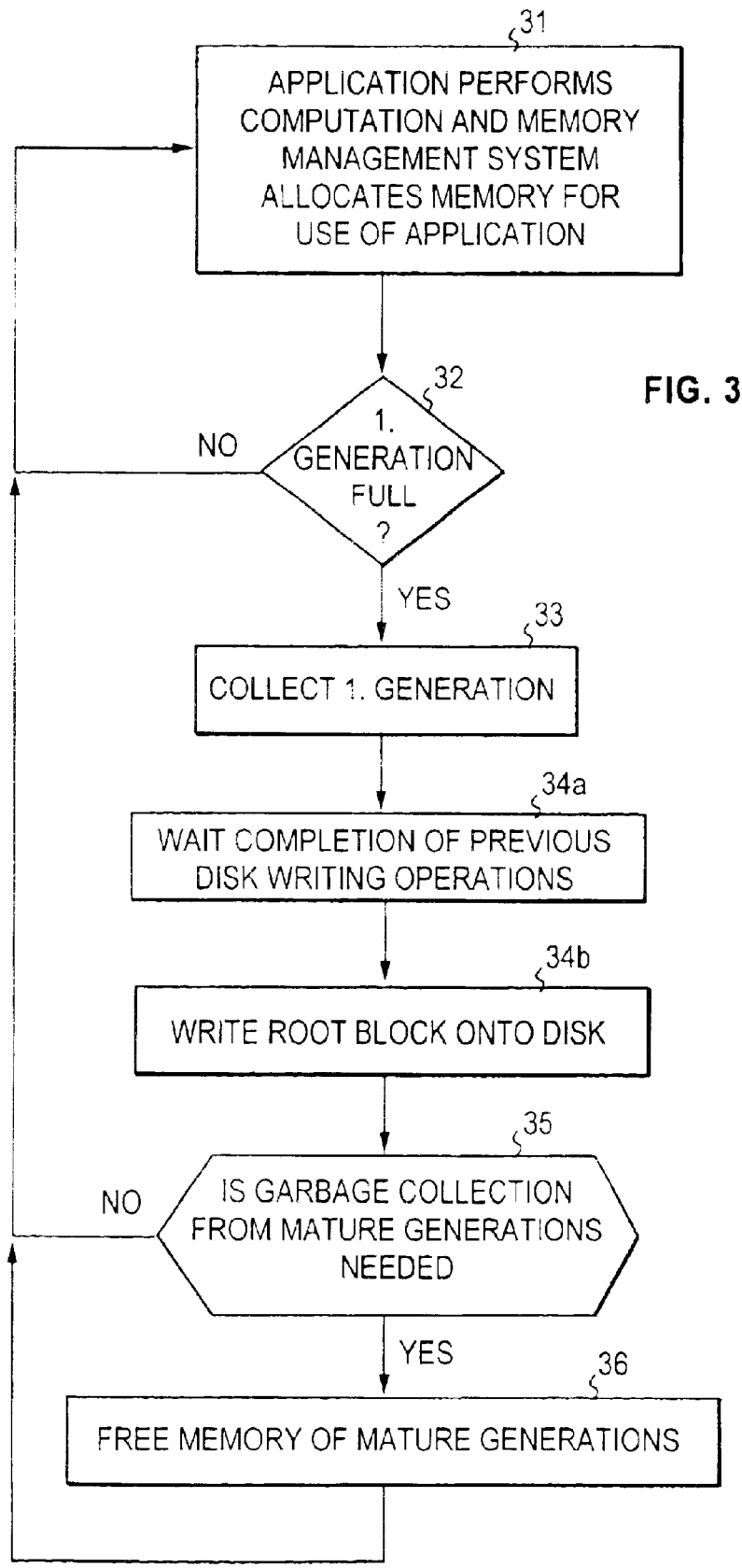
FIG. 3 is a flow chart illustrating the operation of the system in accordance with the invention.

FIG. 3 is a flow chart illustrating the operation of the system in accordance with FIG. 1. The application is executing its dedicated tasks, and when it needs more memory, it requests the memory management system to allocate memory for its use (step 31). The memory management system allocates memory for the use of the application from the area of the first generation. This procedure continues until the first generation is full or its fill rate exceeds a given threshold value. Thereafter the memory management system collects the first generation (step 33). Collection can also be initiated at specific intervals, e.g. when it has been detected in step 32 that the timer is out. The collection of the first generation comprises the following steps: First, the memory management system creates a new mature generation, whereafter it copies into this new mature generation those cells of the first generation which are still alive. Pointers referring to the cells collected from the root block must be updated to point to the new location of the cells in the new mature generation. Finally, the new mature generation must be written onto disk. FIGS. 4a and 4b illustrate the collecting step by depicting four cells C1 . . . C4. When collection is started, the cells are in the first generation (FIG. 4a). Of the cells, the ones not constituting garbage (C1, C3 and C4) are copied into the new mature generation. The pointers from the root block to cells of the first generation are updated to point to the new locations of said cells. The collected data (new mature generation) is backed up by writing it onto disk (arrow A1). When these new pages, which were introduced from the area of the mature generations, have been written onto disk, also the root block is written onto disk (step 34b and arrow A2) into a determined location. The root block must be written onto disk only after said pages, since in the reverse case it may turn out that when a failure occurs immediately after the writing of the root block, the root block on the disk would refer to data that does not exist. Moreover, it is preferable to write the root block twice onto disk (duplicated writing), since such back-up can in practice be easily implemented on account of the smallness of the root block. Finally, the first generation is emptied, and thus memory can again be allocated therefrom for the use of an application.

If thereafter a failure, e.g. a power outage, occurs, the data recently written and the older data in the mature generations can be written back from the disk.

Gradually also the area of mature generations is filled and some of the cells located therein turn into garbage. For this reason, it is tested in step 35 whether garbage collection from the area of mature generations is needed. If there is no need to collect garbage, the control is returned to the application (return to step 31). Otherwise, garbage collection is performed from the area of mature generations (step 36). When this collection has been performed, the control is again returned to the application. In practice, garbage must be collected from the area of mature generations gradually in small quantities, since said area is so extensive that collecting the entire area at a time would take too much time and cause a delay in the operation of the system. Also the mature generations are written onto disk after garbage has been collected therefrom. This disk writing can take place entirely in step 36 of the figure, or it can still continue after the control has been returned to the application, yet being concluded before the writing of the next root block. For this reason, the system can wait before the writing of the root block that all earlier disk writing transactions are completed (step 34a). The mature generations are collected starting from younger down to older generations.

As can be seen from the flow chart, in the method of the invention garbage collection takes place on the so-called stop© principle, that is, in such a way that to create additional memory space, the execution of the application stops and copying garbage collection is initiated. However, unlike the conventional stop© methods, in the present invention there is no need for double memory space for other generations than the one currently being collected. The data in the root block and in the area of mature generations is backed up to disk, but the data in the first generation in each case is not backed up (in practice, the collection of the first generation takes place e.g. 2 . . . 10 times per second).

Figure 5A:
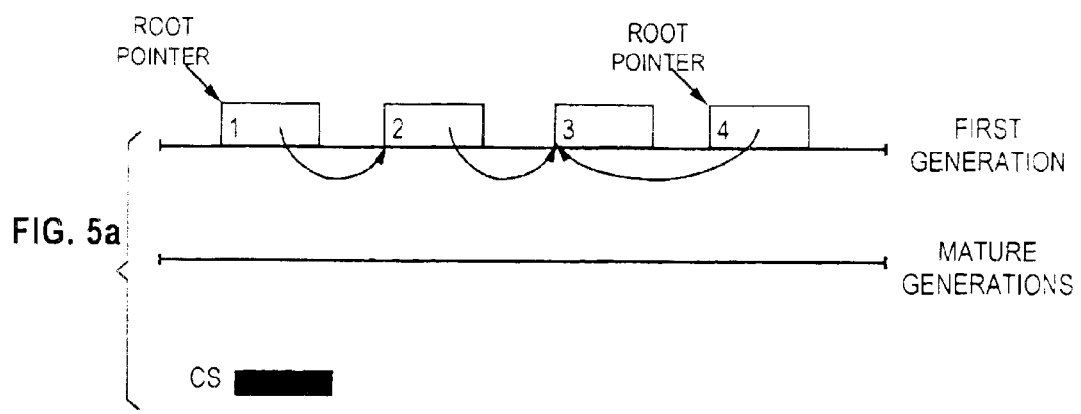

FIGS. 5a . . . 5f illustrate in detail the different steps of collecting the first generation. For clarity, the figure depicts only cells and the pages have not been depicted. As stated previously, the area of mature generations in reality consists of pages that are taken into use as need arises. The cells are shown as rectangles numbered from one to four. In this case, the root block contains pointers to cell 1 and cell 4. In addition, the figure shows a copy stack CS serving as an auxiliary data structure, wherein the addresses of pointers referring to cells that have not yet been copied are stored.

Figure 5B:
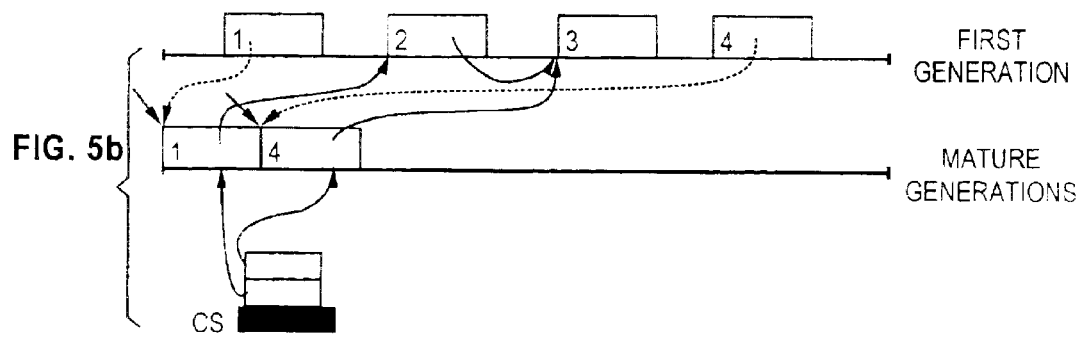

FIG. 5a shows the presumed initial situation where all cells are in the first generation and the copy stack is empty. Collection starts in such a way that the root block is first examined and the cells that are directly pointed to from the root block (not shown) are copied into the area of mature generations. Hence, in this case cells 1 and 4 are copied. At the same time, a pointer is written into the former location of these cells to indicate the location the cell was transferred to. These pointers are called by the English term "forward pointer", being pointers from the former location to the new location of the cell. Forward pointers are denoted with broken lines in the figures. Moreover, the root pointers (oblique arrows) are changed to point to the new location of the cells. Simultaneously as the cells are copied, the pointers contained in them are studied, and the addresses of the pointers located in the (copied) cells are written into the copy stack. First of all, in this case it is found that cell 1 contains a pointer to cell 2. Hence, a pointer to that point of cell 1 which contains a pointer to cell 2 (lowermost element in the stack in FIG. 5b) is stored in the copy stack. Likewise, it is found that cell 4 contains a pointer to cell 3, and thus a pointer to that point of cell 4 which contains a pointer to cell 3 (uppermost cell in the stack in FIG. 5b) is stored in the copy stack. This gives the situation shown in FIG. 5b.

Figure 5C:
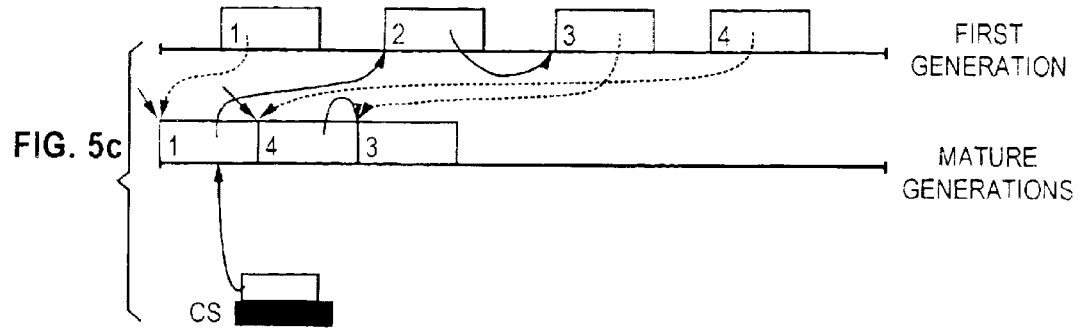
Figure 5D:
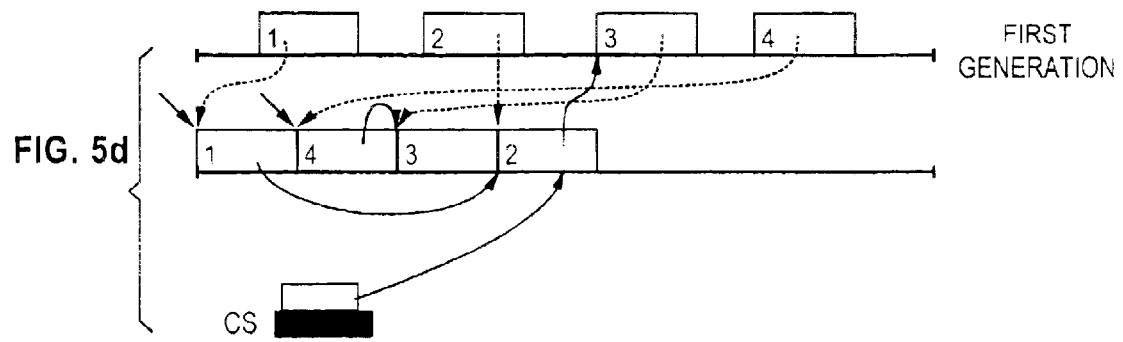

Thereafter, the copy stack is run through from top downwards until the stack is empty. Initially, a pointer to a specific point of cell 4 is read from the stack. At this point, a pointer to cell 3 is found, which is copied from the first generation to the mature generations. The pointer contained in cell 4 is set to point to the new location of cell 3, and a pointer is written into the former location of cell 3 to point to the new location (forward pointer). Thus the situation shown in FIG. 5c has been reached. Thereafter a pointer to a specific point of cell 1 is read from the copy stack. At this point, a pointer to cell 2 is found, which is copied from the first generation to the mature generations. The pointer contained in cell 1 is set to point to the new location of cell 2, and a pointer is written into the former location of cell 2 to point to the new location (forward pointer). Simultaneously as cell 2 was copied, it was found that the cell contains a pointer to cell 3. In this situation, a pointer to that point of cell 2 from which there is a pointer to cell 3 is added to the copy stack. Thus, the copy stack was empty for a short while, but since cell 2 to be copied contained a pointer, the address of said pointer was written into the copy stack. Thus, the situation shown in FIG. 5d has been reached.

Figure 5E:
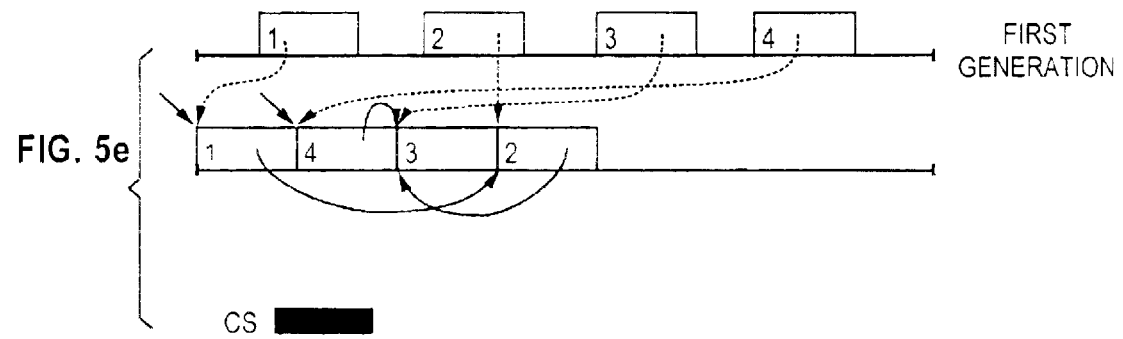
Figure 5F:
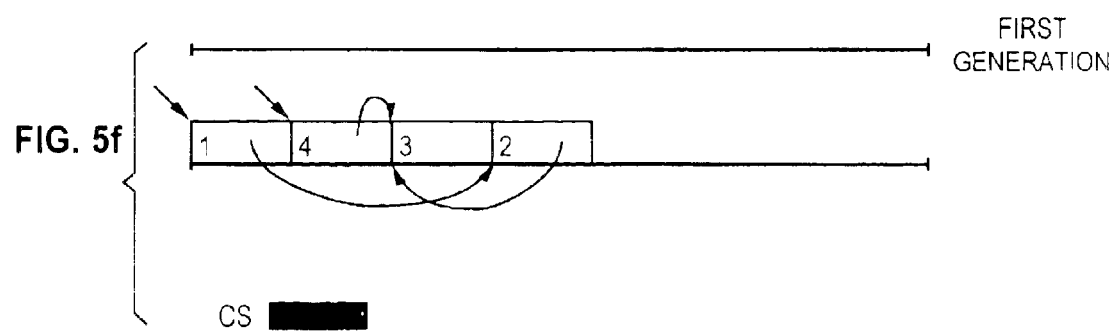

After this, the copy stack is again read and emptied. Thus one proceeds via cell 2 to cell 3, at which point one notices from the forward pointer already located in the cell that cell 3 has already been copied into the mature generations. By tracking the forward pointer, the new location of cell 3 is accessed, and thus the pointer from cell 2 can be changed to the new location of cell 3. This gives the situation shown in FIG. 5e, in which all cells in the first generation have been copied into the mature generations and, furthermore, the copy stack is empty. Thereafter, the new pages (cells 1 . . . 4) of the mature generation (and the root block) can be written onto disk and the first generation can be released for reuse. Thus, the final situation shown in FIG. 5f has been reached: the live cells have been transferred to the area of mature generations, they have been written onto disk (not shown) and the first generation has been released. It is thus checked in the collecting process before copying whether there is a forward pointer from the cell, and copying is only performed if there is no such pointer.

Figure 6A:
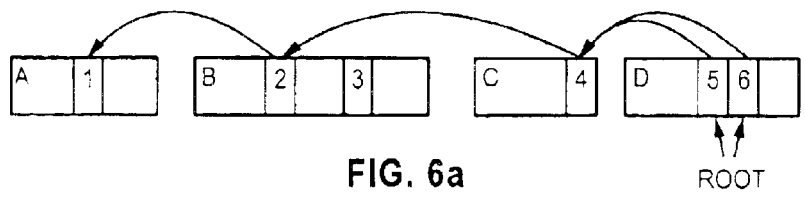

When new pages are taken into use from the area of mature generations, said area is gradually filled, and furthermore the cells in the area are gradually turned into garbage. For this reason, garbage collection must be performed at some stage in the area of mature generations as well. FIGS. 6a . . . 6e illustrate garbage collection from the area of mature generations. In the figure, different generations are depicted with rectangles denoted with letters A . . . G. The generations to be collected are A . . . D, whereof A is the oldest and D the youngest generation. On the other hand, the boxes within the generations, denoted with numbers 1 . . . 8, depict cells. Arrows represent pointers, as earlier.

Figure 6B:
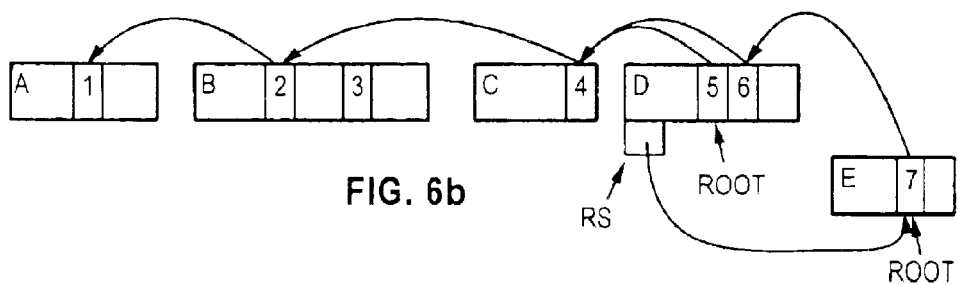

FIG. 6a shows a presumed initial situation (in the central memory). In this case, the root block has pointers to cells 5 and 6. As is to be seen from the figure, cell 3 is garbage. When the garbage collection in the mature generations starts, the generations (A . . . D) intended for collection are marked. Let us assume that at this stage step 31 in FIG. 3 has been reached, in which the memory management system allocates memory for the use of the application until the first generation is filled. When the filled first generation is collected, the situation is as shown in FIG. 6b, in which the area of mature generations additionally comprises the most recent generation E, which in this simplified case contains cell 7 to which there is a pointer from the root block and from which there is a pointer to cell 6 of generation D. It was found in connection with the collection of the first generation that the collected cells (cell 7) contained a pointer to a cell in a generation that has been marked for collection. When such a pointer is detected, the address of said pointer is written into the remembered set of the generation that is pointed to. The remembered sets are denoted in the figure with the reference RS. A remembered set is an ordered set, such as a list, that contains the references between two object sets (generations). Remembered sets are used in this way generationally to indicate references from younger generations to the generation at hand.

Thereafter, mature generation D is first collected. For this purpose, generation D' is allocated, in which the live memory cells of generation D are collected (in the figure, the prime indicates that a copy is concerned). Collection is started by examining the remembered set of generation D. This remembered set now has a reference to a pointer in cell 7 (cf. FIG. 6b), and thus by reading said pointer cell 6 is accessed. Thus, cell 6 is initially copied into generation D' (thus generation D' initially has cell 6'). The pointer from cell 7 is thereafter changed to point to cell 6'. Furthermore, a forward pointer is set from cell 6 to cell 6' (the forward pointers are not shown in the figures). When cell 6 was copied as cell 6', it was also found that cell 6' contains a pointer to a cell (cell 4) in a generation which has not yet been collected but which has been marked for collection. In this case, the address of the pointer located in cell 6' is added to the remembered set of said generation.

When the remembered set of generation D has been examined, the root block is examined. It is found that the root block contains a pointer to cell 5, and therefore cell 5 is copied as cell 5' into generation D' and the pointer from the root block is changed to point to cell 5' (and a forward pointer is set from cell 5 to cell 5'). When cell 5 was copied, it was again found that cell 5' contains a pointer to a cell (cell 4) in a generation which has not yet been collected but which has been marked for collection. In this case, the address of the pointer located in cell 5' is added to the remembered set of said generation.

Figure 6C:
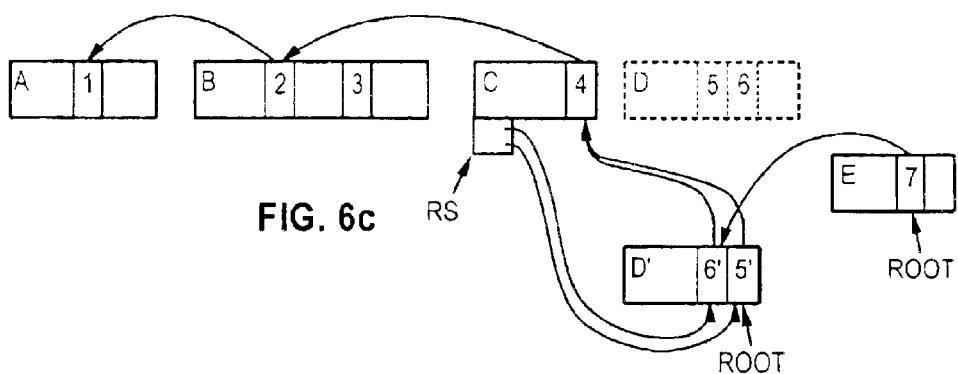

Since the copy stack (not shown) is empty at this stage, there are no cells in generation D that are pointed to from cells 5 or 6. Thereafter, generation D' is written onto disk and the previous generation D is released from the central memory but not yet from disk. Thereby the situation shown in FIG. 6c has been reached, in which the application could be allowed to continue with its task. The remembered sets are not stored on disk at all, since the recovery process is capable of inferring them itself, as will be described hereinafter.

Let us assume at this stage, however, that more free pages are still needed, and therefore after this another mature generation C is collected as generation C' before the control is again returned to the application. The remembered set of the generation to be collected is again examined first. Cell 4 is thus accessed, which is copied as cell 4' into generation C' and a forward pointer is set, which will prevent recopying of cell 4 when cell 4 is accessed a second time from the remembered set of generation C. The pointers from cells 6' and 5' are changed to point to cell 4'. When cell 4 was copied, it was found that cell 4' contains a pointer to a cell (cell 2) in a generation (generation B) which has not yet been collected but which has been marked for collection. In this case, the address of the pointer located in cell 4' is added to the remembered set of said generation.

Figure 6D:
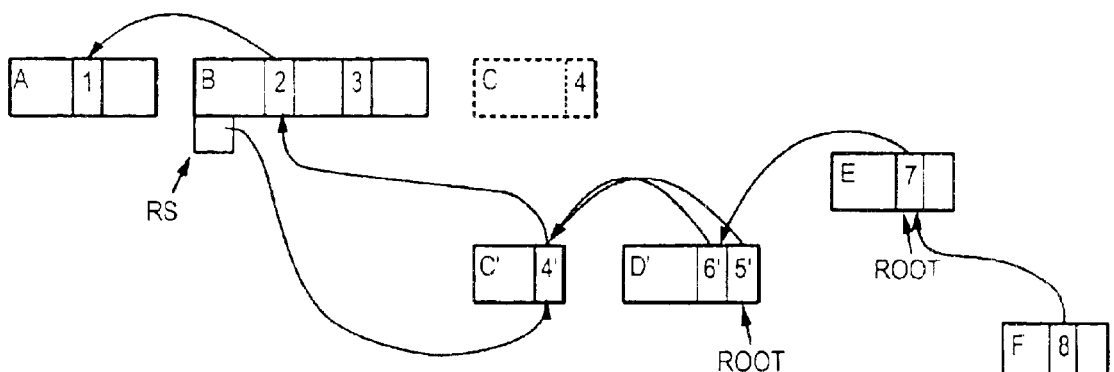

Since the copy stack is now empty (collection in an individual generation is continued until the copy stack is empty), after this generation C' can be written onto disk and generation C can be released from the central memory but not yet from disk. In this way, two mature generations have been collected. Let us assume that no more free pages are needed, and thus the control can now be returned to the application. When the first generation becomes full, it will be collected into a new mature generation F. The resulting situation is as shown in FIG. 6d.

In order that too many mature generations may not be formed, they can also be combined in connection with garbage collection. The combination can, for example, be carried out whenever the combined size of two generations is smaller than a specific predetermined limit. When generations A and B are collected, a new mature generation AB' is created. First, the remembered sets of B and A are again examined, at which point it is detected that cell 4' contains a pointer to cell 2. Cell 2 is copied as cell 2' into generation AB' and a forward pointer is set from cell 2 to cell 2'. A pointer from cell 4' is set to cell 2'. At this stage, it is found that the cell to be copied contains a pointer to a cell that has not yet been copied, wherefore a pointer to that point of cell 2' from which there is a pointer to cell 1 is added to the copy stack (not shown in the figure). The addition is made, since both generations are copied simultaneously (from the point of view of garbage collection, A and B are the same generation, which is why the addition is made to the copy stack).

When the copy stack is emptied, cell 1 is copied as cell 1'. The pointer from cell 2' is set to point to the copied cell (1').

Figure 6E:
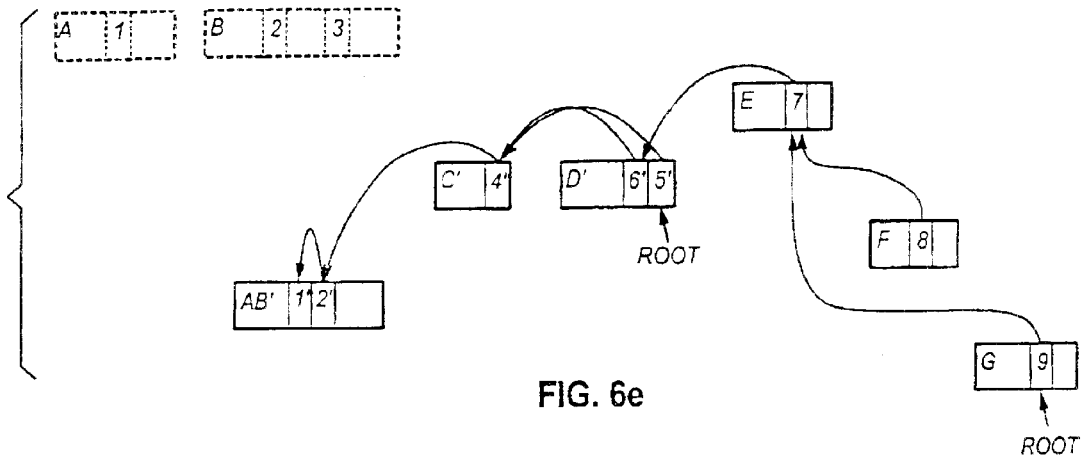

Thereafter, generation AB' is written onto disk and generations A and B are released from the central memory, but not yet from disk. The result is the situation shown in FIG. 6e, in which garbage has been collected from all mature generations once. In the meantime, garbage has been created in the new mature generations; e.g. cell 8 in the examples shown in the figures has turned into garbage, but this garbage is collected in the next collecting cycles.

It can be seen from the foregoing that immediately after collection, the mature generation is precisely the same in the central memory and on disk, but as older generations than the one freshly collected are collected, the references in the younger generations are updated to refer to the new location of the cells of the older generations. This redirection of references is performed in accordance with the invention only in the central memory, not on disk. Hence, the pointers from the younger generation to the older generation in the database image on the disk are obsolete, since on disk they point to locations that have already been freed in the central memory. When for example generation D' had been written on disk, the data (pointer values) in D' was still amended in the central memory but not on disk. It is not desired to update the data (pointers) on disk in connection with collecting the next (older) generation, since it is specifically such updates that cause superfluous disk traffic and are particularly slow as they require small updates at different points (recurrent moving of write head). Therefore, it must be possible to infer from the database image on disk the situation that prevailed in the central memory at the time of failure.

The recovery procedure in accordance with the present invention is capable of reconstructing the run-time older generations by performing a garbage collection-like operation on the disk copy preceding the most current version of the collected generation. By means of such an operation, the obsolete pointers can be corrected. During recovery, such an operation is performed on each collected generation starting from the youngest generation and proceeding to the oldest, and thus the state of the entire database is finally made identical with that immediately preceding the failure. The remembered sets are not written onto disk at all, but the recovery process can infer them itself. Also in the central memory, the remembered sets are alive only for a short while.

Figure 7:
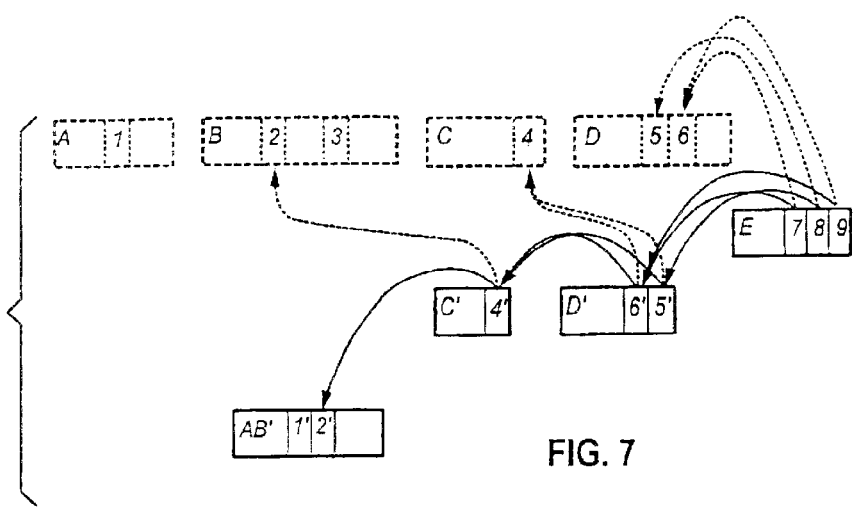
FIG. 7 is an example of the disparity between the central memory and the disk memory in a failure situation, and FIGS. 8a . . . 8c illustrate steps in accordance with the invention for reconstructing a correct database image.

FIG. 7 illustrates an example of the above problem that has to be solved in the recovery process. The figure otherwise corresponds to the situation shown in FIG. 6e, but in view of the graphicness of the example it is presumed that cells 7 . . . 9 are located in generation E (on disk) in such a way that cell 8 points to cell 5 and cell 9 to cell 6. Thus, it is presumed in the example that E is the youngest mature generation. As a result of the collection described above, the situation in the central memory prior to failure was as denoted in the figure with continuous line, whereas it is on the disk after failure as denoted with broken line. Following a power outage, the central memory is empty, and thus the database image denoted with said continuous line must be restored to the central memory on the basis of the data on disk. In other words, in the database image on disk the pointers from a younger to an older generation are obsolete, since they point to generations that have not been collected. These pointers should therefore be updated to be correct in connection with the recovery. (It is to be noted that since D was the youngest collected generation, the collection only rendered the pointers to D and to older generations obsolete, i.e. invalid, and e.g. the pointers from generations F and G are valid, since they were stored as a mature generation immediately after collection, and their pointers have not been subsequently changed in the central memory either.)

Recovery starts with reading generations A, B, C, and D (that is, the pages corresponding to said generations) from disk into the empty central memory, into the locations that they occupied prior to the failure. (The disk contains metadata indicating the locations of said generations.) As was stated above, generations A . . . D were not released from disk yet.

These generations are marked such that they will be collected (the collection takes place in connection with recovery, and its purpose is to reconstruct obsolete pointers to be correct). It is to be noted in this connection that generations A . . . D on disk still contain the garbage that was previously collected in generations A' . . . D'. Recovery consists partly of reading data from disk and partly of an operation resembling garbage collection, in connection with which the remembered sets are reconstructed to the state they were in the central memory immediately prior to the failure. When the remembered sets are in correct form, the obsolete pointers can be changed to point to the correct locations.

Figure 8A:
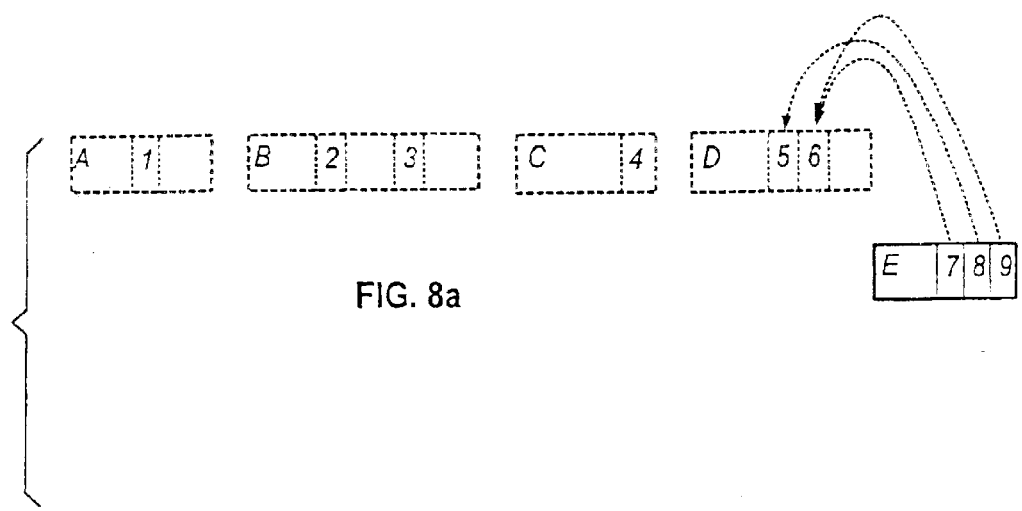

When generations A . . . D have been read from disk and marked for collection, generation E is still read into the central memory, and thus the situation at the central memory is as shown in FIG. 8a. Thereafter, all cells of generation E are examined to establish whether E contains pointers to generations that have been marked for collection. When such cells are detected, the remembered set of the generation in question is reconstructed.

Figure 8B:
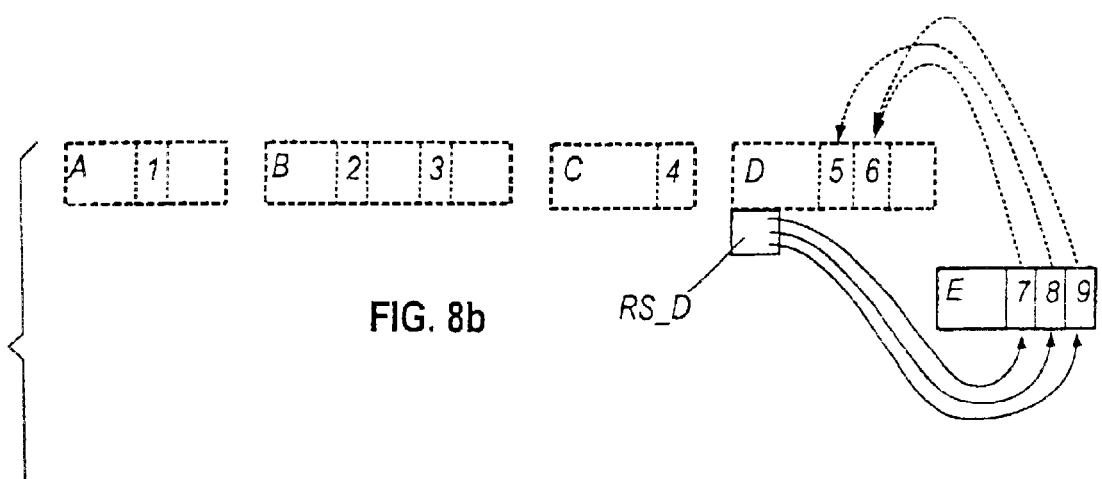

Thus, in this example, it is first found that cell 7 contains a pointer to cell 6, and thus an address to that point of cell 7 from which there is a pointer to cell 6 is first added to the remembered set RS_D of generation D. The next step is to similarly add a pointer to that point of cell 8 from which there is a pointer to cell 5 to the remembered set of generation D, and lastly a pointer to that point of cell 9 from which there is a pointer to cell 6 is further added to the remembered set of generation D in a similar manner. The remembered set of generation D has now been reconstructed to the state it was in prior to the failure. Thus, the situation shown in FIG. 8b has been reached.

Figure 8C:
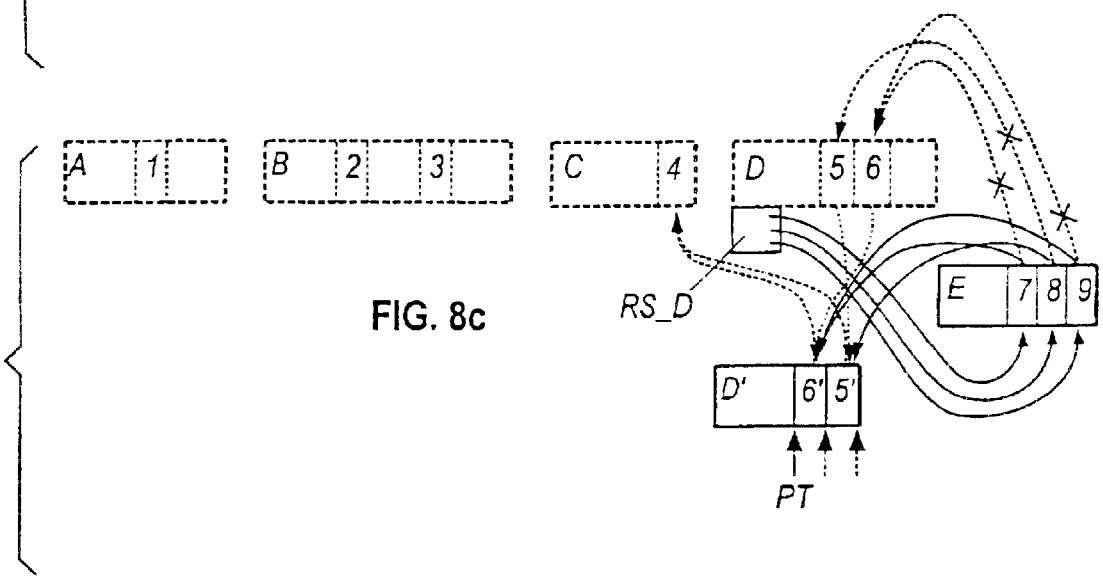

At this stage, generation D' is read from disk to the location at which it was previously, and D' is examined cell by cell to construct forward pointers from generation D to generation D'. The examining is performed by going through the remembered set of D in the same order as in garbage collection prior to failure. For the examining of generation D', pointer SP is set to the beginning of the first cell in the generation (FIG. 8c). The pointer is thereafter moved forward in the manner to be described in the following. When the first element of remembered set RS_D is examined, it is found that it refers to a pointer in cell 7, pointing to cell 6 in generation D. Generation D has no forward pointers, since it was freshly read from disk, and therefore a forward pointer is now constructed to the first cell in generation D'. (The order of the cells is known on the basis of the earlier garbage collection.) At the same time, the pointer found in cell 7 is changed to point to cell 6'. Thereafter pointer PT is brought forward to the beginning of the next cell (5') (denoted with broken line in FIG. 8c) and the next element is read from remembered set RS_D. This points to cell 8 which contains a pointer to cell 5; a pointer is thus constructed from cell 5 to cell 5'. At the same time, the pointer found in cell 8 is changed to point to cell 5'. Thereafter pointer PT is again brought one cell forward, and the next element is read from the remembered set. This points to cell 9 which contains a pointer to cell 6. Now it is found that cell 6 already contains a forward pointer, and thus the value of the forward pointer in cell 6 is simply set as the value of the pointer in cell 9. When a forward pointer is found in a cell, pointer PT is not brought forward.

Hence, even the last one of the pointers in generation E pointing to generation D has been reconstructed to the state prior to the failure. In this way, each pointer in a younger generation (E) is changed to point to a correct cell in an older generation (D'). Updating was effected by first reconstructing the remembered set of the youngest generation (D) to be "collected" using a younger generation and thereafter examining the remembered set similarly as in actual garbage collection. Generation D and the corresponding pages can thereafter be released.

The next step after this is to construct similarly the remembered set of generation C, that is, to examine all cells in the collected generation (D') similarly as was done for generation E above, and to update remembered sets of older uncollected generations. When the remembered set of generation C has been reconstituted, C' is read from disk and forward pointers are constructed from generation C to generation C' and the pointers in generation D' pointing to generation C are changed to point to generation C'. Thereafter all cells of the collected generation (C') are again examined, and remembered sets of the older uncollected generations are updated, etc. When the corresponding operations have been performed on generations B and A, a correct database image has been reconstructed.

In the manner described above, the run-time generations can be reconstructed by "comparing" the latest and preceding disk copies of the collected generation with one another.

The operations described above are set forth under the assumption that the system possesses certain basic characteristics in order for it to be possible to implement the functionalities described above. First, it must be possible to identify the pointers from the cells, that is, it must be possible to find pointers (and identify forward pointers) from among the content of the cells. On the other hand, it must also be possible to distinguish cell boundaries, i.e., the length of each cell.

Generations A . . . D need not necessarily be read from disk to the central memory for the recovery process if all pointers in junior generations can be specified without looking at other cells, that is, if the cells represent themselves.

Since additions are made to the remembered sets in connection with the collection of mature generations when it is found, in copying a cell, that it contains a pointer to a cell in a still uncollected generation, and since in recovery the new generation is examined and remembered sets of older non-collected generations are updated, the content of the remembered sets in each stage is always the same prior to and during recovery. However, it is not necessary to update the remembered sets immediately upon copying, but this can be done in a separate examination afterwards, for example in connection with recovery. The method set out above is more rapid, however.

What is essential in the method described above is that when remembered sets are examined, the cells which the pointers contained in them point to are copied to determined locations, so that after recovery the cells are in the same locations as prior to failure. It is, for example, possible in principle to start copying the cells into a new generation from the end thereof if the memory stores information on the size of the generation. Likewise, a new generation could be examined from end to beginning to update remembered sets of older uncollected generations. Thus, reconstructing remembered sets can take place in a variety of ways, as long as it takes place in similar manner in connection with recovery and prior to recovery.

Changing the pointers indicated by the remembered set to point to the cells of said most current version could also be implemented in such a way that the forward pointers are stored in a separate storage area which has the length of the preceding version (e.g. D) of the generation and which contains a forward pointer at a corresponding point that it would occupy in said generation (D). This solution has the advantage that the generation remains the same during the entire garbage collection, and thus it can be used in systems in which more than one processor performs garbage collection in parallel.

Even though the invention has been described in the above with reference to examples in accordance with the accompanying drawings, it is obvious that the invention is not to be so restricted, but it can be modified within the scope of the inventive idea disclosed in the appended claims. For example, the method can be used in a variety of different application environments. As was stated above, the greatest benefit from the method is obtained in a backed-up environment in which real-time operation is essential. In addition to the fields of application stated above, the invention can be utilized in industrial process controls, for example.

What is claimed is:

1. A method for recovering a database provided with disk back-up, the method comprising the steps of:

maintaining in a central memory a database comprising a first generation and at least one mature generation, said generations containing memory cells in which data and additionally pointers constituting references between memory cells are stored, in the area of mature generations in the central memory, maintaining generation-specific remembered sets, in which addresses of the pointers pointing to each generation in question are listed, allocating memory for the use of an application from the area of the first generation in the central memory, in the area of the first generation, periodically collecting live memory cells as a new mature generation into the central memory into the area of mature generations, performing garbage collection generationally in the area of mature generations, whereby in connection with the collection a remembered set is examined and live memory cells are copied in the order indicated by the remembered set into a temporally more recent mature generation, storing the mature generation after the garbage collection in a separate disk memory, as the garbage collection proceeds, making changes, in the area of mature generations, to the references between generations in a generation that has already been stored in disk memory, wherein making at least some of said changes in the central memory only, maintaining in the disk memory, in addition to the most current versions of the mature generation stored on disk, the previous version stored on disk, and performing recovery by means of said versions (a) by reconstructing the remembered set of previous version stored on disk, said remembered set indicating the pointers referring to the generation in question, and (b) by changing the pointers indicated by the remembered set to refer to the memory cells of said most current version.

2. A method as claimed in claim 1, wherein connection with the recovery an auxiliary pointer is set to point to the first memory cell of said most current version, the remembered set is examined in the same order as in garbage collection, wherein (i) when in connection with examining the remembered set a given memory cell in said previous version is accessed for the first time, a pointer is constructed to point from the memory location corresponding to said memory cell to the memory cell pointed to by the auxiliary pointer, the pointer indicated by the remembered set is changed to point to the memory cell pointed to by the auxiliary pointer, and the auxiliary pointer is moved one memory cell forward in said most current version, and (ii) when in connection with examining the remembered set a given memory cell is again accessed, the value of the pointer already located at the memory location corresponding to said memory cell is given to the pointer indicated by the remembered set and the moving of the auxiliary pointed is omitted, and all memory cells in the collected generation are examined and remembered sets of older uncollected generations are updated.

3. A method as claimed in claim 2, wherein when in connection with examining a remembered set a given memory cell in said previous version is accessed for the first time, said pointer is written directly into said memory cell, as a result of which it points from said memory cell to the memory cell pointed to by the auxiliary pointer, wherein when in connection with examining the remembered set a given memory cell is again accessed, the value of the pointer already located in said memory cell is given to the pointer indicated by the remembered set.

4. A method as claimed in claim 1, wherein remembered sets are stored in the central memory in connection with uncollected generations only.

5. A method as claimed in claim 4, wherein when it is found in connection with the collection of any generation that a collected memory cell contains a pointer to a memory cell in a generation that has been marked for collection, the address of said pointer is added to the remembered set of said generation.

6. A method as claimed in claim 1, wherein garbage collection in the area of mature generations is performed starting from younger generations toward older generations.

7. A method as claimed in claim 6, wherein in collecting a mature generation a new version of the generation is allocated into the area of mature generations, the remembered set of the generation to be collected is examined in such a way that the memory cells pointed to by the pointers indicated by the remembered set are copied into said new version in the order of examining the remembered set, and the root block of the memory is examined in such a way that the memory cells to which the root block has pointers are copied into said new version.

8. A method as claimed in claim 7, wherein when it is found in connection with the collection of a mature generation that a copied memory cell contains a pointer to a memory cell in a generation marked for collection, the address of said pointer is added to the remembered set of said generation.

9. A method as claimed in claim 8, wherein during garbage collection, two generations are combined into one generation if their combined size is smaller than a specific predetermined limit.

10. A system for recovering a database provided with disk back-up, the system comprising a central memory and a separate disk memory and being configured to:

maintain in the central memory a database comprising a first generation and at least one mature generation, said generations containing memory cells in which data and additionally pointers constituting references between memory cells are stored, maintain, in the area of mature generations in the central memory, generation-specific remembered sets, in which addresses of the pointers pointing to each generation in question are listed, allocate memory for the use of an application from the area of the first generation in the central memory, periodically collect, in the area of the first generation, live memory cells as a new mature generation into the central memory into the area of mature generations, perform garbage collection generationally in the area of mature generations, whereby in connection with the collection a remembered set is examined and live memory cells are copied in the order indicated by the remembered set into a temporally more recent mature generation, store the mature generation after the garbage collection in the separate disk memory, and as the garbage collection proceeds, make changes, in the area of mature generations, to the references between generations in a generation that has already been stored in disk memory, wherein the system is configured to make at least some of said changes in the central memory only, maintain in the disk memory, in addition to the most current versions of the mature generation stored on disk, the previous version stored on disk, and perform recovery by means of said versions (a) by reconstructing the remembered set of previous version stored on disk, said remembered set indicating the pointers referring to the generation in question, and (b) by changing the pointers indicated by the remembered set to refer to the memory cells of said most current version.

* * * * *